June 12, 1962     R. ALTSON     3,038,766
JOURNAL BOX

Filed Oct. 15, 1958     2 Sheets-Sheet 1

INVENTOR
Ralph Altson
BY Edward H. Goodrich
HIS ATTORNEY

INVENTOR
Ralph Altson
BY Edward H. Goodrich.
HIS ATTORNEY

United States Patent Office 3,038,766
Patented June 12, 1962

3,038,766
JOURNAL BOX
Ralph Altson, Douglaston, N.Y., assignor to General Motors Corporation, Detroit, Mich., a corporation of Delaware
Filed Oct. 15, 1958, Ser. No. 767,379
4 Claims. (Cl. 308—180)

This invention relates to journal boxes and particularly to an improved railway journal box provided with a replaceable antifriction bearing that receives an axle for free rotation.

To meet the demand of the railroad industry, antifriction bearings for railroad journal boxes often have to be of such size as to constitute a replacement unit for installation in place of the plain bearing in a journal box which has been standard construction for a great many years. Consequently, many of these antifriction journal boxes employ antifriction bearings which are too small to provide as great a load-carrying capacity as desired. Also, in many instances it has been necessary to remove the car axles and turn the ends down to fit the antifriction bearings in such a journal box. Furthermore, for some heavy duty applications, antifriction journal boxes are of a size which require reconstructing the pedestals and other parts of car truck associated with the journal box.

It is, therefore, an object of this invention to provide an improved journal box having a plurality of rolling elements which rotatably receive an axle therein.

Another object of this invention is to provide an improved journal box for rotatably receiving an axle and of such dimensions as to constitute a replacement unit for a plain bearing type of journal box.

A further object resides in the provision of an improved journal box of simple, reliable, rugged construction and having a series of circumferentially spaced parallel rolling elements which provides for free axle rotation and also limits the extent of endwise axle movement.

To these ends and also to improve generally upon devices of this character, the invention consists in the various matters hereinafter described and claimed. In its broader aspects, the invention is not necessarily limited to the specific structures selected for illustrative purposes in the accompanying drawings wherein FIGURE 1 is a vertical sectional view through my journal box and taken generally along the line 1—1 of FIGURE 3;

Figure 1:
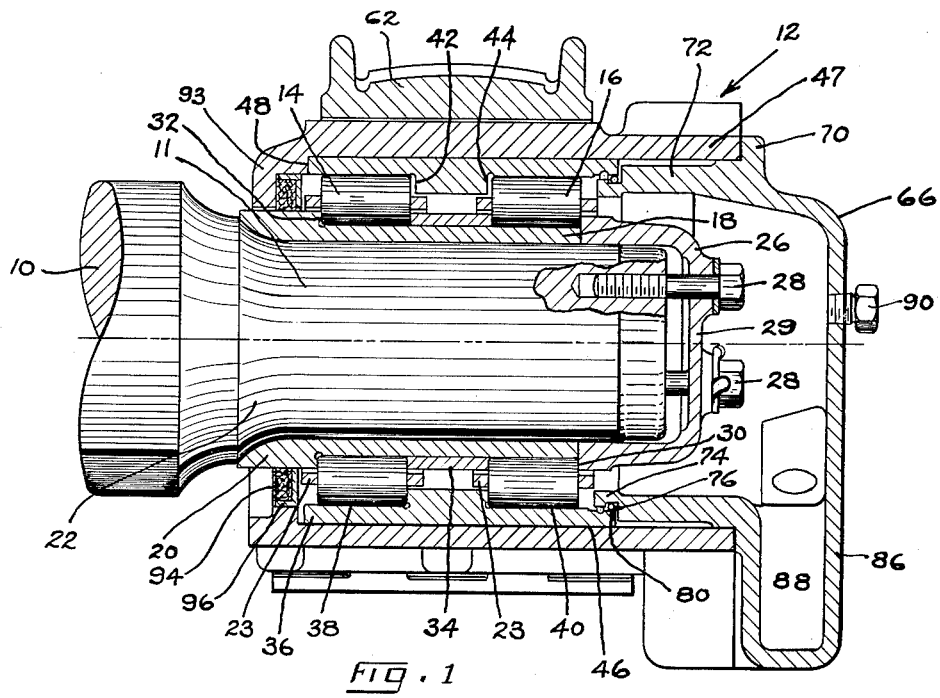
Figure 2:
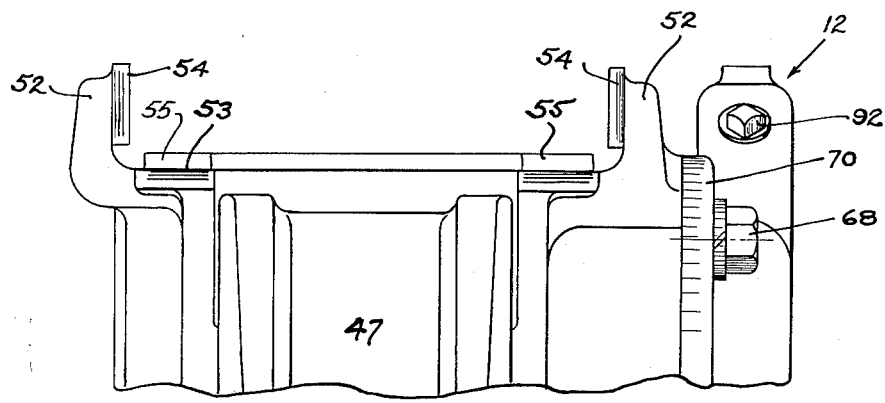
FIGURE 2 is a fragmentary plan view of the journal box.
Figure 3:
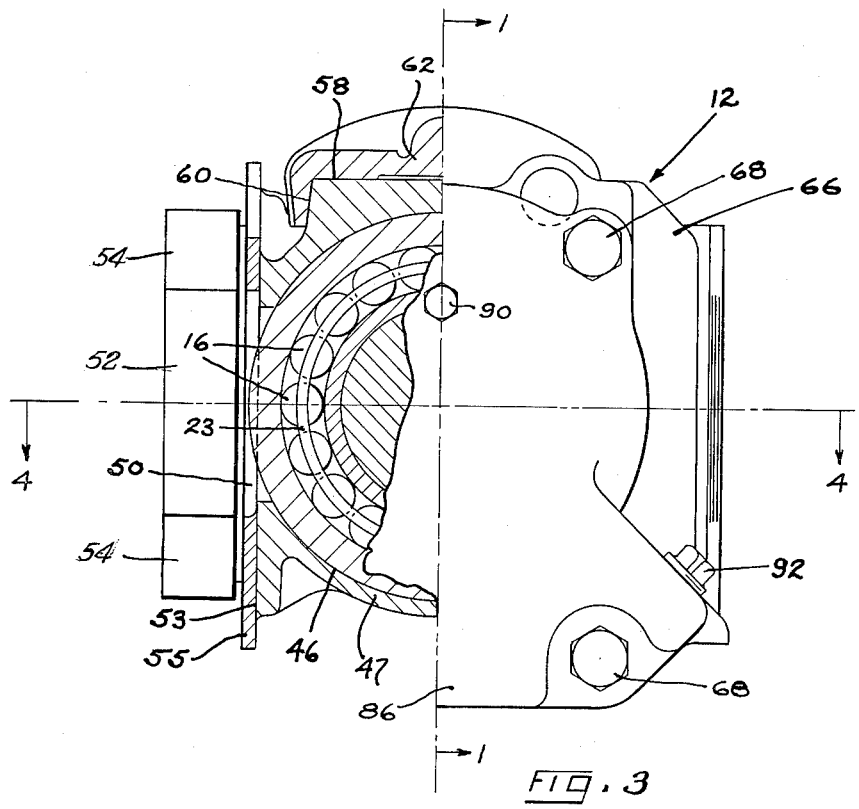
FIGURE 3 is a fragmentary front end view of the journal box with parts partially broken away to show the interior parts in vertical section.
Figure 4:
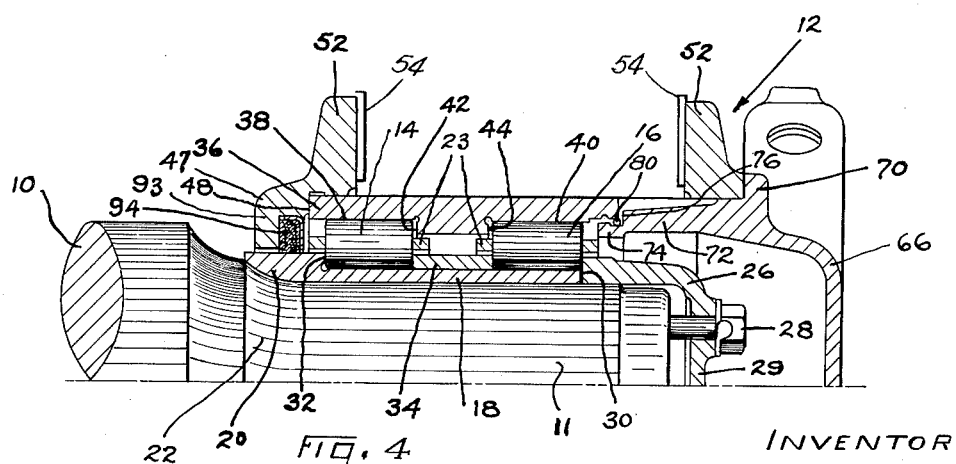
FIGURE 4 is a fragmentary horizontal sectional view through the journal box and taken generally along the line 4—4 in FIGURE 3.

An axle 10 is received for antifrictional rotation in a journal box 12 through two similar rows of bearing rollers 14 and 16, herein shown cylindrical and which are free to roll upon a hardened cylindrical sleeve or inner race ring 18 which is pressed over a reduced end 11 of the axle. The inner end of the race ring 18 has an annular flange 20 abutting an enlargement 22 of the axle 10. The rollers of each row are circumferentially spaced about the race ring 18 by an annular cage 23, these rollers being loosely received within circumferentially spaced pockets in these cages. A locking cup 26 is slidably and demountably fitted over the end of the reduced axle portion 11 and clamped in abutting engagement with the outer end of the race ring sleeve 18 by demountable clamping members such as cap screws 28 passing through an end cap wall 29 and threaded in the axle 10 to tightly hold the sleeve 18 on the reduced axle portion and in abutting engagement with the axle portion 22. A substantially radial annular shoulder 30 on the locking cup is engageable with the outer ends of the rollers 16 and a similar radial annular shoulder 32 formed on the flanged portion 20 of the inner race ring 18 is arranged to be abuttingly engaged by the inner ends of the set of rollers 14. A spacer sleeve 34 between the sets of rollers 14 and 16 is slidably journalled on the inner race ring and is of such axial length that the sets of rollers are free to roll on the inner race ring without binding while being substantially axially positioned with respect to the axle 10.

The antifriction bearing has an outer race ring 36 provided with a pair of axially spaced annular raceways 38 and 40 respectively receiving the sets of rollers 14 and 16. These raceways respectively terminate at their inner ends in a pair of axially spaced generally radial annular shoulders 42 and 44 which are spaced apart through a distance less than the length of the spacer sleeve 34 to provide for a limited controlled amount of endwise movement of the axle 10 within the journal box 12. The periphery of the outer race ring 36, which is preferably cylindrical, is snugly and demountably fitted within a bore 46 in the housing 47 of the box 12 and against an end housing shoulder 48. To provide for the largest size roller bearing possible in my journal box while maintaining the exterior dimensions of the journal box at a minimum, the bore 46 is of a size such that it breaks through the opposing side walls of the journal box housing forming a pair of windows one of which is shown at 50. Each side of the housing 47 is provided with a pair of laterally projecting and vertically extending spaced pedestal flanges 52 respectively located at the ends of the window 50. The inner faces of these pedestal flanges and a flat side face 53 on the housing are lined with flat wear plates 54 and 55 which may slidably receive the usual vertical pedestal portions of a railway car truck to locate the journal box in position. The wear plates 54 and 55 are suitably secured in position as by welding. The top of the housing has a flat supporting face 58 extending between a pair of downwardly directed side walls 60. An equalizer plate or saddle 62 which receives and supports a portion of the car truck, is seated upon the flat top face 58 and has depending side flanges interfitting with the side walls 60.

A front end cap 66 demountably secured to the front end of the housing as by cap screws 68 has a flanged portion 70 sealingly seated against the flat annular end wall of the housing 47. A sleeve portion 72 piloted within the end of the bore 46 terminates in a reduced annular stepped portion 74 fitting within the outer end of the raceway 40 while an annular shoulder 76 on this sleeve portion abuts against the end of the outer race ring 44 to clamp it in position within the housing and against the shoulder 48. I preferably provide a sealing ring 80 such as a resilient rubber-like O-ring between the stepped portion and the raceway 40 to prevent lubricant leakage. The end cap 66 is provided with a forwardly and downwardly extending portion adjacent to its front wall 86 providing a lubricant well 88. The upper portion of the wall 86 has an inspection opening normally closed by a threaded plug 90 and the wall 88 has a filling opening closed by a plug 92. The rotation of the axle 10 and associated bearing members 14 and 16 and the cages 23 provide a satisfactory pumping action to distribute lubricant from the well 88 through the bearing. The rearward end of the housing has a flange 93 which closely surrounds the cylindrical exterior surface of the flanged portion 20 of the race ring 18 and a suitable seal such as a felt ring 94 held in position within an annular housing recess as by a metal retainer 96 is in wiping engagement with the cylindrical periphery of the flanged portion 20 to prevent lubricant leakage from the rear of the journal box 12.

I claim:

1. In a journal box which receives an axle for rotatable and endwise movements, a unitary housing, a pair of spaced pedestal flanges laterally projecting from each side of the housing, the housing having a longitudinal axle-receiving bore, the diameter of said housing bore exceeding the housing width between the pairs of pedestal flanges and providing lateral openings between the flanges entering said bore, a cylindrical outer race ring tightly fitted throughout its length in the bore and closing said lateral openings, rolling elements within the race ring and receiving the axle for rotation in the housing, means providing rolling element engaging shoulders limiting endwise movement of the axle in the housing, and a front end cap secured to the housing in overlying spaced relation to an end of said axle.

2. In a journal box which receives an axle for rotatable and endwise movements, a housing having a longitudinal bore, a pair of vertically disposed spaced pedestal flanges laterally extending from said side of the housing, said flanges being respectively located at the forward and rearward ends of the housing, said bore having a diameter exceeding the housing width between the sets of flanges and providing diametrically disposed windows laterally opening between each pair of flanges into the bore, a cylindrical race ring fitted throughout its length within the bore and closing both window openings, a circumferential series of rolling elements within the race ring and rotatably receiving said axle, shouldered members on the axle axially locating the rolling elements with respect to the axle, the outer race ring having spaced shoulders providing for predetermined limited endwise movements of the rolling elements within said race ring, and an end cap secured to the outer end of the housing and overlying the outer end of the axle.

3. In a journal box which receives an axle for rotatable and endwise movements, a unitary housing having a longitudinal bore, a pair of vertically disposed spaced pedestal flanges laterally projecting from each side of the housing and respectively located at the forward and rearward ends of the housing, the diameter of said bore exceeding the housing width only between the sets of flanges and providing diametrically disposed lateral window openings through the housing between the flanges, a cylindrical race ring snugly fitted throughout its length within the bore and closing both window openings, the race ring having a pair of annular raceways terminating at their inner ends in spaced annular shoulders, an inner race ring fitted over the shaft end within the housing, spaced sets of circumferentially disposed rollers rollingly engageable with said raceways and with the inner race ring, shoulders associated with the inner race ring cooperating with the outer race ring through said rollers to provide for limited endwise movements of the rollers in said first mentioned race ring and an end cap secured to the housing and fitting within an end of the outer race ring.

4. In a journal box which receives an axle for rotatable and endwise movements, a housing having a longitudinal bore, a pair of vertically disposed spaced pedestal flanges on each side of the housing and located at the forward and rearward end of said housing, said bore having a diameter exceeding the housing width only between said flanges and providing diametrically opposed windows laterally opening into the bore between each pair of pedestal flanges, an inner race ring demountably fitted over the axle and having a rearward cylindrical portion, a rear housing portion in sealing relation with said cylnidrical portion, an outer race ring demountably fitted throughout its length within the bore and closing both window openings, said outer race ring radially projecting out of said windows, a plurality of series of circumferentially arranged rollers between the race rings to provide for axle rotation, an end cap closing the forward end of the housing, an annular seal radially seated between the end cap and the forward end of the outer race ring, and said cap having a well for supplying lubricant to the rolling elements.

References Cited in the file of this patent

UNITED STATES PATENTS

| | | |
|---|---|---|
| 2,197,499 | Heinze | Apr. 16, 1940 |
| 2,607,638 | Horger | Aug. 19, 1952 |
| 2,783,102 | Palmgren | Feb. 26, 1957 |
| 2,802,705 | Halvorsen | Aug. 13, 1957 |